United States Patent
Hunter et al.

(10) Patent No.: US 6,486,881 B2
(45) Date of Patent: Nov. 26, 2002

(54) BASIS FUNCTIONS OF THREE-DIMENSIONAL MODELS FOR COMPRESSION, TRANSFORMATION AND STREAMING

(75) Inventors: Peter J. Hunter, Parnell (NZ); Poul F. Nielsen, Auckland (NZ); David Bullivant, Auckland (NZ); Mark Sagar, Santa Monica, CA (US); Paul Charette, Valencia, CA (US); Serge LaFontaine, Lincoln, MA (US)

(73) Assignees: Lifef/x Networks, Inc., Newton, MA (US); Auckland UniServices Limited, Auckland (NZ)

( * ) Notice: Subject to any disclaimer, the term of this patent is extended or adjusted under 35 U.S.C. 154(b) by 0 days.

(21) Appl. No.: 09/882,718

(22) Filed: Jun. 15, 2001

(65) Prior Publication Data

US 2002/0039454 A1 Apr. 4, 2002

Related U.S. Application Data

(60) Provisional application No. 60/211,683, filed on Jun. 15, 2000.

(51) Int. Cl.[7] .............................................. G06T 13/00
(52) U.S. Cl. .................... 345/473; 345/475; 345/646
(58) Field of Search ................ 345/473, 474, 345/475, 646

(56) References Cited

U.S. PATENT DOCUMENTS 5,818,463 A  10/1998 Tao et al. ............... 345/473
5,970,173 A * 10/1999 Lee et al. ............... 345/474
6,072,496 A   6/2000 Guenter et al. ............ 345/419

OTHER PUBLICATIONS

Chan, Tony. An Improved Algorithm for Computing the Singuylar Value Decomposition. ACM Transactions on Mathematical Software, vol. 8, No. 1, Mar. 1982, pp. 72–83.*

Bascle, B. et al. Separability of pose and expression in facial tracking and animation. Computer Visioon. 1998. 6th Internatona Conference. 4–7 Jan. 1998. pp. 323–328.*

Klema, V., et al., The Singular Value Decomposition: Its Composition and Some Applications. IEEE Transaction on Automatic Control. Apr. 1980, Vol. AC–25. No. 2. pp. 164–178.

Bascle, B. et al., Separability of pose and expression in facial tracking and animation. Computer vision, Sixth International Conference. Jan. 4–7, 1998 pp. 323–328, esp. Section 3, pp. 325–327.

* cited by examiner

Primary Examiner—Mark Zimmerman
Assistant Examiner—Philip H. Stevenson
(74) Attorney, Agent, or Firm—Weingarten, Schurgin, Gagnebin & Lebovici LLP (57) ABSTRACT

An image processing system in which the vertices of an object contained within an image are analyzed using a singular value decomposition (SVD) method is disclosed. The use of the SVD allows the original vertices data to be reduced through filtering or truncating the singular values associated with the image. In addition, the reduced vertices data and the associated SVD matrices allows for efficiently streaming video data.

32 Claims, 3 Drawing Sheets

BASIS FUNCTIONS OF THREE-DIMENSIONAL MODELS FOR COMPRESSION, TRANSFORMATION AND STREAMING

CROSS REFERENCE TO RELATED APPLICATIONS

This application claims priority under 35 U.S.C. §119(e) to U.S. Provisional Patent Application No. 60/211,683 filed Jun. 15, 2000, the disclosure of which is hereby incorporated by reference.

BACKGROUND OF THE INVENTION

In computer graphics the shape of a displayed object can be approximated by a set of geometric primitives such as polygons or curvilinear elements such as polynomials, splines, or NURBS (Non-Uniform Rational B-Splines. These geometric primitives can be described in terms their position in a predetermined set of spatial coordinates using two or three-dimensional coordinates of their vertices or end points and additional data may also be used such as derivatives or normals.

A rigid body is one in which the vertices used to describe the object do not undergo a displacement relative to a body centered coordinate system, where the origin of the body centered coordinate system may be the center of mass of the object. In contrast, a deformable object is one in which the vertices used to describe the object undergo deformation relative to the body centered coordinate system.

In a dynamic animation of an object the new coordinate positions of a rigid body can be found in terms of translations and rotations of the object. These calculations can be directly calculated using matrix multiplication in which a rotation-translation matrix is multiplied by a vertices-data matrix that stores the coordinate positions of the vertices of the object. However, a dynamic animation of a deformable object involves not only the translation and rotation of the vertices of the object, but also the relative displacement of each the vertices with respect to the body centered coordinate system. The relative displacement is difficult to calculate and therefore, it would require the specification of each of the vertices for each image in the animation. Storing the data necessary to define each of the vertices in space for each image in the animation could require a very large amount of storage area. In some instances, the animation that includes a deformable object may be transmitted in real time over a data network, such as the internet, as streamed video. In this instance the amount of data to stream over the network includes the coordinates of the vertices defining an object in each frame. Data streaming this data would require a very high bandwidth connection to allow the large amount of data to be transmitted at a data rate sufficient to establish the proper images.

Therefore what is needed in the art is an apparatus and method to allow the data corresponding to the vertices of a deformable object to be efficiently stored or transmitted.

BRIEF SUMMARY OF THE INVENTION

A method and apparatus are disclosed for analyzing a three-dimensional (3D) object and reducing the amount of data necessary to accurately reproduce the image. In particular, an 3D object is analyzed and a set of vertices is selected and formed into a vertices-data matrix A. This matrix A is analyzed using a singular value decomposition (SVD) technique that forms the matrices U, W, and V, wherein $A = UWV^T$. In addition, the singular values in the matrix W associated with the vertices-data-matrix A are determined. These singular values can be truncated or filtered and the dimensions of the vertices-data-matrix A can be reduced thereby. In a data streaming application having a source and a destination, a constant product of $VW^T$ is formed and provided to the destination. The source then forms row vectors $U_i$ of the matrix U, from the row vectors of the reduced dimension matrix A, according to $U_i = A_i V W^{-1}$. The destination receives row vectors of U and reconstructs the 3D object according to $A = UWV^T$.

BRIEF DESCRIPTION OF THE SEVERAL VIEWS OF THE DRAWING

The invention will be more fully understood by reference to the following Detailed Description of the Invention in conjunction with the drawings of which.

DETAILED DESCRIPTION OF THE INVENTION

Figure 1:
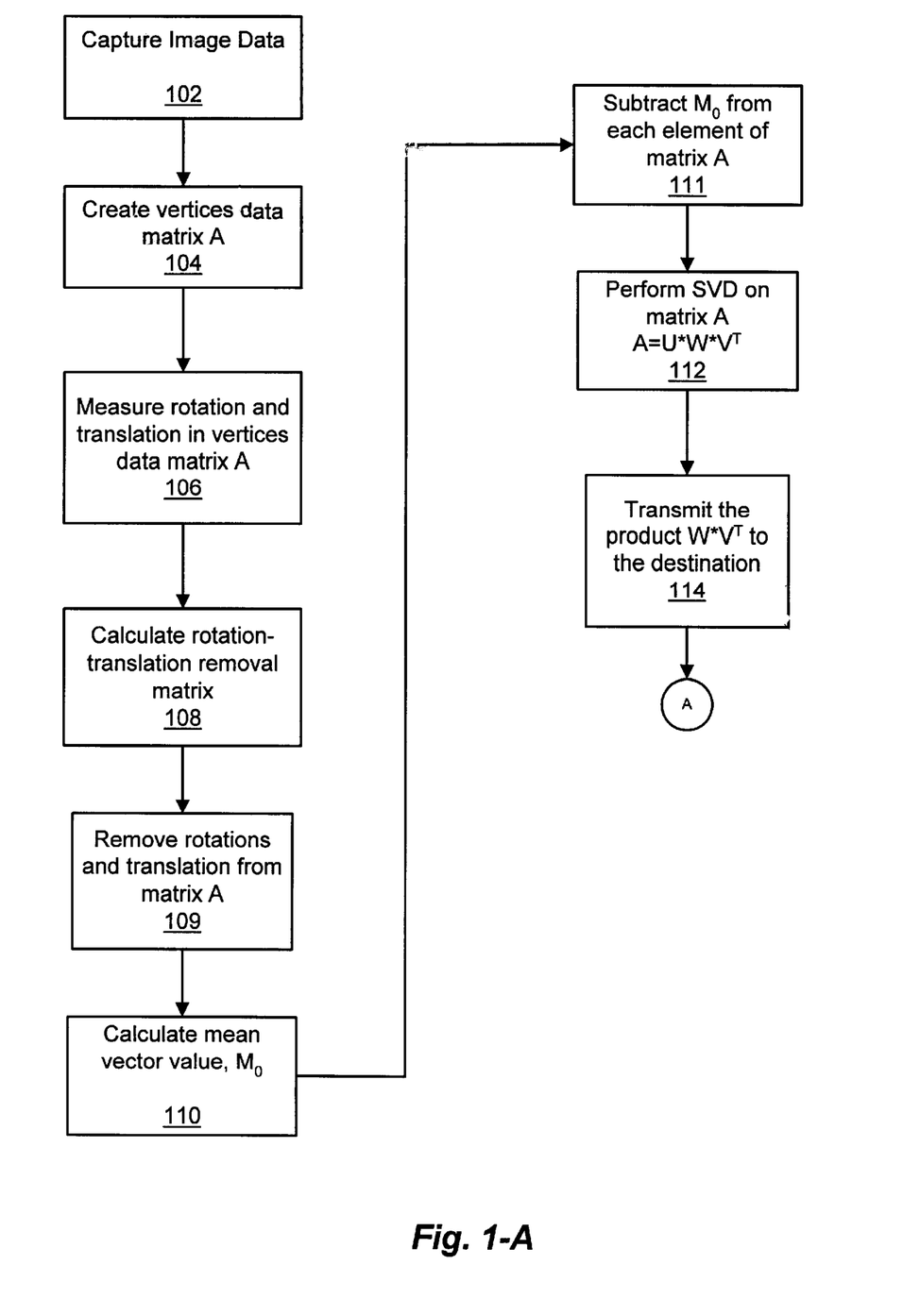
FIGS. 1A and 1B are a flow chart depicting a method for executing the image processing method described herein.

FIG. 1 illustrates a three-dimensional (3D) processing method in accordance with the present invention. The 3D object data is captured or accessed as depicted in step 102. The 3D data may be obtained from a 3D digital motion-capture system such as a video camera or single two-dimensional (2D) image that has been converted to a 2D or 3D computer graphics model. Alternatively, the 3D data may be obtained from a previously stored file of image or video data. The 3D object data is analyzed to ascertain objects contained within the image. These objects are selected and approximated using a set of vertices of geometric primitives such polygons or curvilinear elements such as splines or polynomials. The vertices of the geometric primitives are used to define the various objects. The vertices can be the endpoints of a line or curvilinear segment of the corners of one or more polygons or a surface or surfaces that can be used to define the objects within the image. Each of the vertices is assigned a unique two or three dimensional coordinate based on a previously defined set of coordinate axes. If an object defined by a set of vertices is part of a video motion capture system or dynamic animation then the coordinates of the vertices may be functions of time as well as space.

The coordinates of the predetermined vertices are placed into a vertices-data-matrix, A, in which the rows correspond to the various images and the columns correspond to the various coordinates, as depicted in step 104. An exemplary matrix A in which the vertices are defined by a three-dimensional coordinate (x,y,z) is depicted below:

$$A = \begin{bmatrix} x_{1,1} & y_{1,1} & z_{1,1} & \cdots & x_{1,n} & y_{1,n} & z_{1,n} \\ x_{2,1} & y_{2,1} & z_{2,1} & \cdots & x_{2,n} & y_{2,n} & z_{2,n} \\ \vdots & & & \ddots & & & \vdots \\ x_{k,1} & y_{k,1} & z_{k,1} & \cdots & x_{k,n} & y_{k,n} & z_{kn,z} \end{bmatrix} \quad \text{Eq. 1}$$

In general, the number of rows of the matrix A, i.e., the number of images or frames, k, will be greater than the number of coordinates of the vertices, i.e., a vertices in an M-tuple space (x,y,z). in the exemplary matrix A depicted as Eq. 1. Alternatively, this may be extended to higher dimensional spaces as well Where k is the number of rows in the matrix A, and $A^T_i$ is the sum of the row vector corresponding to the subscript i.

In one embodiment, the captured digital image is of the head of an actor, wherein the actor is displaying a variety of reference facial expressions. These expressions may be combined or sequenced to form a dynamic animation of a person's face or head based on the actor's features or expressions. In this embodiment, the various rotation angles and translations of the actor's head in the reference expressions are measured, as depicted in step 106, and a rotation and translation removal matrix R is formed in a conventional manner which includes the rotation angles, or equivalent Euler angles, and the translations, as depicted in step 108. This matrix R is applied to the matrix A, as depicted in step 109, as follows:

$$A=R*(A*-T) \qquad \text{Eq. 2}$$

where R is the rotation removal matrix and T is the translation removal matrix and A* is the matrix that includes the various rotations and translations. In general R will be a sparse matrix and in one embodiment a smaller dimension, i.e., 3×3 R matrix can be used corresponding to specific head rotations and applied only to those vertices affected by the particular instance of the rotations. The T matrix is typically a diagonal matrix having diagonal values that correspond to the translation for the corresponding axis.

In one embodiment, the mean of the matrix A is calculated and subtracted from each of the coordinates in the matrix A, as depicted in steps 110 and 111 respectively. Alternatively, instead of the mean of the matrix A, any Bayes shape could be used as a starting point as well. In general the mean of the matrix A is given by:

$$M_0 = \frac{1}{k}\sum_{i=1}^{k} A_i^T \qquad \text{Eq. 3}$$

The singular value decomposition (SVD) is a technique for factorizing that is able to effectively and efficiently reduce any matrix, even a singular matrix, into a product of three matrices. For example an m by n dimension matrix, A, is converted into:

$$A_{m,n}=U_{m,n}*W_{n,n}*V_{n,n}^t \qquad \text{Eq. 4}$$

where U is an m by n column orthogonal matrix, W is an n by n diagonal matrix with positive or zero valued elements, and $V^T$ is the transpose of an orthogonal matrix V. The elements of the diagonal matrix W are the singular values of the matrix A and in general $$\sigma_1 \geq \sigma_2 \geq \ldots \geq \sigma_r \geq 0 \qquad \text{Eq. 5}$$

where r is the minimum of m and n, the dimensions of A. The singular values of the matrix A are the eigenvalues of A.

It is known that the singular value decomposition of a non-square matrix A is closely related to the eigen-decomposition of the symmetric matrices ATA or AAT since:

$$A^T A v_i = \sigma_i^2 v_i \text{ or } AA^T \mu_i = \sigma^2 \mu_i \qquad \text{Eq. 6}$$

Accordingly, filtering of the images contained within the vertices-data-matrix A can be accomplished by truncating the dimension of the matrix W in Eq. 4, or setting all singular values below a certain threshold to zero. This will have the effect of reducing the components of the image that do not contain meaningful information.

In general the rank of A will be less than the minimum of either of the dimensions m and n. Accordingly, in general the rank of the matrix W and $W^{-1}$ will be r, and W and $W^{-1}$ will have zeros filled in where the singular values are numerically to small to be accurately represented by the machine precision, or have been filtered as described above. As a result the matrix A can be approximated in the singular value decomposition by a smaller dimension matrix A' Reducing the order of the matrices is analogous to the filtering discussed above. The row vectors comprising the matrix A can be approximated as a linear combination of the singular values and the appropriate vectors of the U and V matrices:

$$A_i'=U_i \cdot (\Sigma \cdot V)=\{\mu_{k1}\sigma_k v_{k1}, \mu_{k2}\sigma_k v_{ks}, \ldots \mu_{kn}\sigma_k v_{kn}\} \qquad \text{Eq. 7}$$

where $A'_i$ is the row vector of the matrix A', a is the singular value $u_i$ is the row vector of the matrix U, and $v_1$ to $v_i$ are the appropriate vectors of the matrix V. Thus, the matrix A can be consolidated and approximated by reducing the number of singular values used and reducing the U and V matrices appropriately.

By approximating the vertices-data-matrix A using the SVD process described above, as depicted in step 112, the method disclosed herein provides an advantage by reducing the amount of data needed to reconstruct the original object. By reducing the order of the matrices to rank R, and using the SVD matrices to approximate A as discussed above, allows a U matrix to be determined by:

$$A_i=U_i*W*V^T \qquad \text{Eq. 8}$$

where A is a row of the vertices-data-data matrix A'. approximated by R terms, V is the transpose of the matrix $V^T$ from Eq. 4, $W^{-1}$ is the inverse of the diagonal matrix W from Eq. 4, and $U_i'$ is a row vector of the matrix U' corresponding to the approximated row vector A'.

Transferring digital images in real time across a data network is commonly referred to as streaming video. Streaming video typically requires a very high bandwidth connection to ensure that the image data is received with a minimum of delays. The method of using a computer graphics model and reducing the amount of data necessary to reconstruct a digital image or dynamic animation disclosed herein is advantageous over streaming video between a source and a destination. As used herein a source and a destination are devices that are capable of interfacing to a data network, storing data in memory, performing computations on data, and displaying graphical images.

Referring again to FIG. 1, in a streaming application the product $W*V^T$ is formed using the reduced order matrices and transferred to the destination and stored therein in a form accessible for future computations, as depicted in steps 114 and 116. If a rotation-translation removal matrix R was formed and the rotations and translation data is desired to be included in the objects then the inverse of the R matrix is formed and transferred to the destination where it is stored as depicted in steps 118, 120, and 122 respectively. If the matrix mean $M_0$ has been calculated and removed from the values of the vertices-data-matrix A, the average value $M_0$ is transferred to and stored at the destination, as depicted in steps 123 and 124. Each image or frame k stored in the vertices-data-matrix A that is to be displayed at the destination is transformed into a row of matrix U according to Eq. 8 and the result is transferred to the destination, as depicted in steps 126 and 128 respectively. The image is then reconstructed according to the following equation, as depicted in step 130:

$$A_i = R^{-1}*(U_i*W*V^T + M_0) + T \qquad \text{Eq. 9}$$

where $A_i$ is reconstructed vertices data matrix corresponding to the image to be displayed, $R^{-1}$ is the inverse of the rotation translation removal matrix, U, V, and W are the results of the singular value decomposition, and $M_0$ is the computed average from Eq. 3. Further objects can be streamed by repeating steps 126, 128, and 130.

Alternatively, the matrix U can be predetermined and transferred, along with the other matrices R and $WV^T$, along with the shape value $M_0$, to the destination over the network, and stored therein. In this embodiment, one or more weighting factors would be selected and transferred from the source to the destination along with indicia of a corresponding row vector of the U matrix. The various row vectors of U would be multiplied by the corresponding weighting factors. This combination would then be processed as discussed above to provide an object that is a composite of the selected row vectors of U.

In another alternative embodiment, the various precomputed matrices R and $WV^T$, along with the shape value $M_0$ can be provided to the destination using a form of computer readable medium such as a floppy disk, a CD-ROM disk, a DVD disk, or other computer readable medium. The matrices could be loaded into the destination or operated from the computer readable medium. In this embodiment, the various row vectors of U could be provided over the network and processed as discussed above. Alternatively, the matrix U could also be provided on a computer readable medium such as a floppy disk, CD-ROM disk, or DVD disk that could be the same computer readable medium providing the other precomputed factors or a different computer readable medium. Accordingly, the source could then provide weighted coefficients to the destination and processed as discussed above. as discussed above.

In another alternative embodiment, a physiologically based mathematical model of a face could be constructed so as to compute various facial expressions or deformations based upon input stimuli to the various physiological structures such as muscles, nerves, and joints. This model could be used to compute the U matrix used above. Alternatively, the model could be used to compute various facial expressions directly and as such could be used to generate facial expressions or object images that constitute the A matrix above.

The models could be static, i.e. when the shape of the object (or location of vertices) are not dependant on previous history (previously assumed shapes) or dynamic when the shape depends on previously assumed shapes in time or the how an external variable has been evolving in the past. Models can also be linear or nonlinear. These mathematical models can also be expressed in many ways, such as a state-variable model, a finite-element model or nonparametric representation. Models are typically predicting changes in the location of vertices. One example could be the stimulation of a muscle group leading to a deformation of a face (smile, wink, etc.). In the case of a nonlinear state-space variable one could represent the deformation of the face in response to a nerve stimulation $S_k = S(t_k)$, $t_k = \{0, T, 2T, \ldots nT\}$:

$$A_i = G(A_{i-1}, S_{i-1}) \qquad \text{Eq. 10}$$

This mathematical expression for G could be downloaded or streamed first. Secondly in order to produce an effect on the face only the signal $S_i$ would have to be streamed or sent, and the deformation computed. However even if the download time is smaller, the computation can be enormous. An improved technique to animate the face consists in building a model based on the SVD coefficients $U_i$ rather than the nodes:

$$U_i = G(U_{i-1}, S_{i-1}) \qquad \text{Eq. 11}$$

$$A_i = U_i \cdot WV^T \qquad \text{Eq. 12}$$

In yet another embodiment a mathematical model, such as a finite element model, is used to create a first set $\{A_i\}$ of faces. From this computation is then computed matrices V and W that are subsequently used with the above techniques for streaming and animation.

In yet another embodiment, a first set of faces $A^1_i$ any of the technique described above or from any modeling tool. Subsequently other sets, $A^2_i$, $A^3_i$, ... are constructed. For each matrix $A_i$, matrices $W_i$ and $V_i$ are constructed as well as products $W_i V_i^T$. From the ensemble $\{W_i V_i^T\}$ a new singular value decomposition is done giving matrices W and $V^T$. From these new matrices W and $V^T$ any new animation $A_i$ can be transformed in a $U_i$ sequence and streamed.

Figure 2:
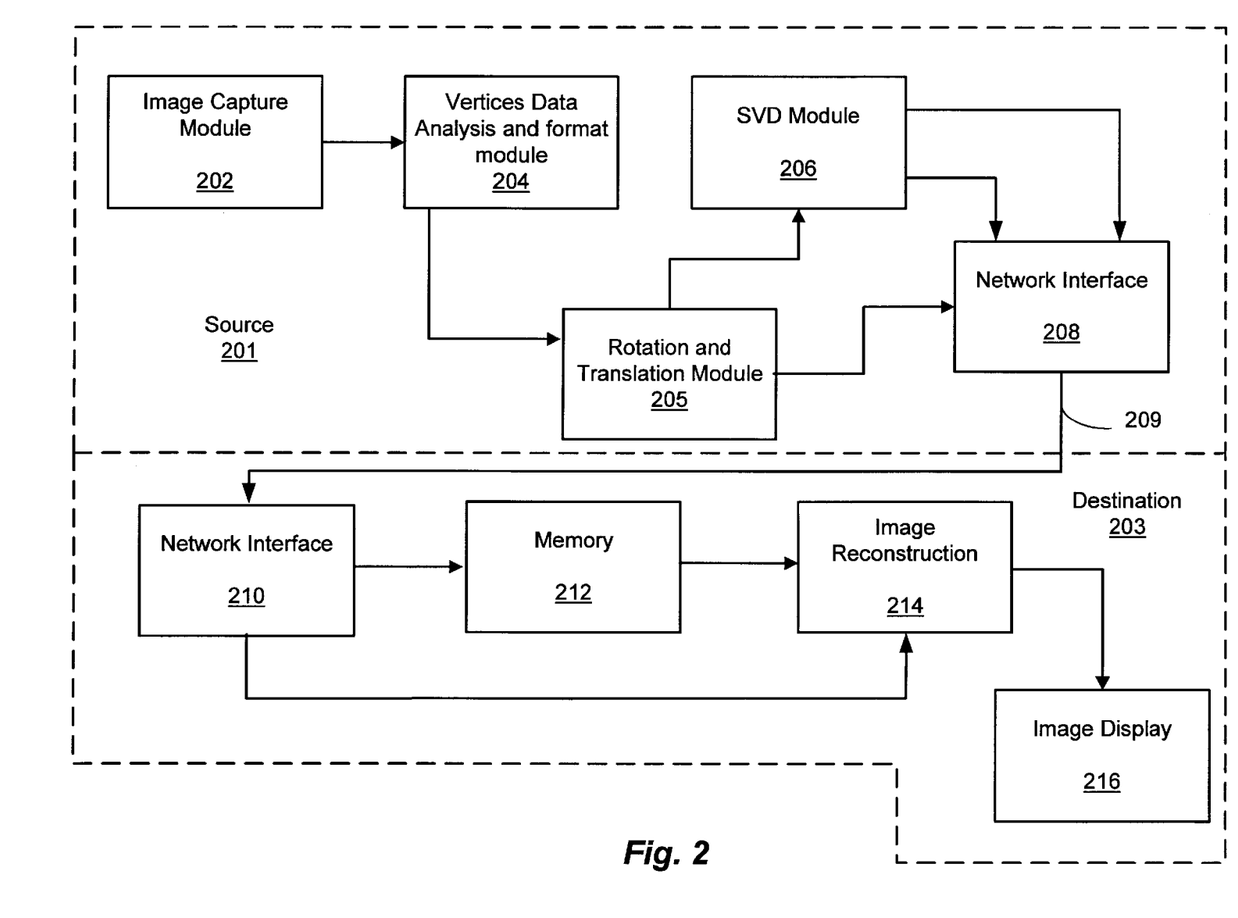
FIG. 2 is a block diagram of a video streaming system in accordance with the image processing system described herein.

FIG. 2 depicts a block diagram of a streaming 3D computer graphics apparatus consistent with the method described above. In particular the images are captured by the image capture module 202 and provided to the vertices data analysis and format module 204. The vertices data analysis and format module 204 analyzes the images and determines the number and location of the vertices used to describe the image. A rotation and translation module 205 measures and forms the rotation-translation-removal matrix and removes the same from the vertices-data-matrix A. If desired, the vertices-data-matrix A is formed and the matrix A mean $M_0$ is determined and subtracted from each matrix A element. The SVD module 206 performs the SVD on the vertices-data-matrix A and finds the U, W, and V matrices. This module also truncates/filters the W matrix at a level that allows for data reduction and still provides for a sufficiently high picture quality. In addition the SVD module 206 forms the product $VW^{-1}$, and will form the row vectors of the matrix U that are to be sent as well. The product $VW^{-1}$ along with the inverse of the rotation-translation-removal matrix R and the matrix mean value $M_0$ are provided to the network interface 208 and transferred on data network 209 to the destination 203. The network interface 210 at the destination 203 stores the received data in memory 212. Image data in the form of row vectors of the matrix U are formed in the SVD module 206 under control of the source process (not shown) and provided to the network interface 208 for transmission across the data network 209. Upon being received at the network interface 210, the image data is provided to the image reconstruction module 214 to be combined with the previously stored data to be displayed on image display 216. Alternatively, the image data can be stored in memory to be reconstructed at a later time.

Each of the above described modules can be an individual processor executing a single source program, or a single central processor unit comprised of one or more processors may execute each function using software in which the individual processes are separate routines, objects, functions or other software units.

Those of ordinary skill in the art should further appreciate that variations to and modification of the above-described methods and apparatus for the above described image processing system may be made without departing from the inventive concepts disclosed herein. Accordingly, the invention should be viewed as limited solely by the scope and spirit of the appended claims.

What is claimed is:

1. A method for streaming, over a network connection between a source and a destination, an animated digital display including a plurality of digital image frames, each digital image frame containing an animated object having a plurality of vertices, each of the plurality of vertices having a corresponding spatial coordinate, the method comprising the steps of:

combining the set of vertices for the object contained in each of the plurality of digital image frames into a vertices data matrix, A;

performing a singular value decomposition (SVD) on the vertices data matrix, wherein $A=U* W* V^T$;

determining the SVD basis matrix;

sending the SVD basis matrix from the source to the destination via the network connection;

determining a plurality of SVD coefficients;

storing the SVD basis matrix at the destination;

sending the plurality of SVD coefficients from the source to the destination via the network connection; and reconstructing the vertices data matrix as a function of the SVD coefficients and the SVD basis matrix.

2. The method of claim 1, wherein the step of determining the SVD basis matrix includes the calculation of $W* V^T$.

3. The method of claim 1, wherein the step of determining the plurality of SVD coefficients, U, includes the calculation $U=A* V* W^{-1}$.

4. The method of claim 3, wherein the step of reconstructing the vertices data matrix includes the calculation $U* W* V^T$.

5. The method of claim 1, further including prior to the step of determining the SVD basis matrix the steps of:

reducing the number of entries in the W matrix according to a predetermined threshold; and removing the corresponding rows in the V matrix.

6. The method of claim 1, further including prior to the performing a singular value decomposition step the steps of:

determining the rotation angles from the rotation data;

determining the translation data;

removing rotation data of the animated object from the vertices data matrix;

removing translation data of the animated object from the vertices data matrix;

forming a rotation-translation matrix, R, including the rotation angle and the translation data of the rotation data and translation data;

transmitting the rotation-translation matrix, R, from the source to the destination via the network connection; and storing the rotation-translation matrix, R, at the source, wherein the step of reconstructing the vertices data matrix includes the step of multiplying the rotation-translation matrix, R, by the reconstructed vertices data matrix, $A_j$.

7. The method of claim 1 wherein the vertices data matrix, A, includes a plurality of column vectors, and wherein prior to the step of performing a SVD, calculating the mean, $M_0$, for each the plurality of column vectors, and removing the mean, $M_0$, of each of the column vectors from each entry in the corresponding column vector, and wherein the step of reconstructing the vertices data matrix, A, further includes reconstructing the vertices data matrix as a function of the SVD coefficients, the SVD basis matrix, and the mean of each of the plurality of column vectors, $M_0$.

8. The method of claim 7, wherein the step of reconstructing the vertices data matrix includes the calculation $U* W* V^T+M_0$.

9. The method of claim 7, wherein the step of reconstructing the vertices data matrix is a function of the SVD coefficients, the SVD basis matrix, the mean of each of the plurality of column vectors, $M_0$, and the rotation-translation matrix R.

10. The method of claim 7, further including wherein the step of reconstructing the vertices data matrix includes the calculation $R* (U* W \star V^T+M_0)$.

11. The method of claim 1, prior to the step of reconstructing further including the steps:

storing the matrix, U, at the destination; and transmitting from the source to the destination via the network, a plurality of weighting functions each corresponding to one or more rows the matrix U;

retrieving the corresponding rows from the matrix U;

weighting the one or more rows of the matrix U by the corresponding weighting function, and combining the weighted rows of the matrix U together.

12. A method for filtering an animated digital display including a plurality of digital image frames, each digital image containing an animated object having a plurality of vertices, each of the plurality of vertices having a corresponding spatial coordinate, the method comprising the steps of:

combining the set of vertices for the object contained in each of the plurality of digital image frames into a vertices data matrix, A;

performing a singular value decomposition (SVD) on the vertices data matrix, A, wherein $A=U* W* V^T$;

reducing the number of entries in the W matrix according to a predetermined threshold; and removing the corresponding rows in the V matrix.

13. A method for compressing an animated digital display including a plurality of digital image frames, each digital image frame containing an animated object having a plurality of vertices, each of the plurality of vertices having a corresponding spatial coordinate, the method comprising the steps of:

combining the set of vertices for the object contained in each of the plurality of digital image frames into a vertices data matrix, A;

performing a singular value decomposition (SVD) on the vertices data matrix, wherein $A=U* W* V^T$;

determining the SVD basis matrix, $W* V^T$;

storing the SVD basis matrix;

determining a plurality of SVD coefficients, U, wherein $U=A* V* W^{-1}$;

storing the plurality of SVD coefficients; and reconstructing the vertices data matrix, A, as a function of the SVD coefficients and the SVD basis matrix, wherein $A=U* W* V^T$.

14. A computer programming product including a computer readable medium, said computer readable medium having a computer program stored thereon, said computer program for execution within a image processing unit for streaming, over a network connection between a source and a destination, an animated digital display including a plurality of digital image frames, each digital image frame containing an animated object having a plurality of vertices, each of the plurality of vertices having a corresponding spatial coordinate, said computer program comprising:

program code for combining the set of vertices for the object contained in each of the plurality of digital image frames into a vertices data matrix, A;

program code for performing a singular value decomposition (SVD) on the vertices data matrix, wherein A=U* W* $V^T$;

program code for determining the SVD basis matrix;

program code for sending the SVD basis matrix from the source to the destination via the network connection;

program code for determining a plurality of SVD coefficients;

program code for storing the SVD basis matrix at the destination;

program code for sending the plurality of SVD coefficients from the source to the destination via the network connection; and program code for reconstructing the vertices data matrix as a function of the SVD coefficients and the SVD basis matrix.

15. An apparatus for streaming, over a network connection between a source and a destination each having a source and destination network interface respectively, an animated digital display including a plurality of digital image frames, each digital image frame containing an animated object having a plurality of vertices, each of the plurality of vertices having a corresponding spatial coordinate, the apparatus comprising:

a vertices data module, receiving the plurality of spatial coordinates corresponding to the plurality of vertices, the vertices data module configured and arranged to form a vertices-data-matrix, A;

an SVD module receiving the vertices-data-matrix, A, and configured and arranged to perform a singular value decomposition (SVD) of the vertices-data-matrix, A, wherein A=$UWV^T$, the SVD module further configured and arranged to form the product $WV^T$, and further configured and arranged to form a row vector of U according to U=$AVW^{-1}$;

the source network interface receiving the product $WV^T$ and is configured and arranged to transmit the product $WV^T$ over the data network, the source network interface also receiving the row vector of U and further configured and arranged to transmit the row vector of U over the data network;

the destination network interface receiving the product $WV^T$ and the row vector of the matrix U;

a memory module to store the product $WV^T$; and a image reconstruction module receiving the row vector of U and the product $WV^T$ and is configured and arranged to combine the row vector of U with product $WV^T$ to reconstruct the image stored in the row of matrix A, wherein A=$UWV^T$.

16. The apparatus of claim 15 further comprising:

a rotation translation module receiving the vertices data matrix A and being configured and arranged to form a rotation and translation removal matrix R and $R^{-1}$, and further configured and arranged to remove at least one of a rotation, a translation, or both contained within the vertices data matrix A, and forming a vertices data matrix A', wherein A'=RA;

the SVD module receiving the vertices-data-matrix, A', and configured and arranged to perform a singular value decomposition (SVD) of the vertices-data-matrix, A', wherein A'=$UWV^T$, the SVD module further configured and arranged to form the product $WV^T$, and further configured and arranged to form a row vector of U according to U=$A'VW^{-1}$;

the source network interface further receiving the matrix $R^{-1}$ and transmitting said $R^{-1}$ across the data network to the destination network interface;

the memory module to store the matrix $R^{-1}$; and the image reconstruction module further receiving the matrix $R^{-1}$ and being configured and arranged to combine the row vector of U with product $WV^T$ and with the matrix $R^{-1}$ to reconstruct the image stored in the matrix A, wherein A=$R^{-1}UWV^T$.

17. The apparatus of claim 15 wherein the vertices data module is further configured and arranged to compute the mean value of the vertices data matrix, $M_0$, and to remove the mean value, $M_0$, from each element in the vertices data matrix A;

and wherein the source network interface transmits the mean value, $M_0$, to the destination network interface via the data network; and and wherein the image reconstruction module to reconstruct the image stored in the row of matrix A, wherein A=$UWV^T+M_0$.

18. A method for streaming, over a network connection between a source and a destination, an animated digital display including a plurality of digital image frames, each digital image frame containing an animated object having a plurality of vertices, each of the plurality of vertices having a corresponding spatial coordinate, the method comprising the steps of:

combining the set of vertices for the object contained in each of the plurality of digital image frames into a vertices data matrix, A;

performing a singular value decomposition (SVD) on the vertices data matrix, wherein A=U* W* $V^T$;

determining the SVD basis matrix;

providing the SVD basis matrix from the source to the destination;

determining a plurality of SVD coefficients;

storing the SVD basis matrix at the destination;

providing the plurality of SVD coefficients from the source to the destination; and reconstructing the vertices data matrix as a function of the SVD coefficients and the SVD basis matrix.

19. The method of claim 18, wherein the step of determining the SVD basis matrix includes the calculation of W* $V^T$.

20. The method of claim 18, wherein the step of determining the plurality of SVD coefficients, U, includes the calculation U=A* V* $W^{-1}$.

21. The method of claim 20, wherein the step of reconstructing the vertices data matrix includes the calculation U* W* $V^T$.

22. The method of claim 18, further including prior to the step of determining the SVD basis matrix the steps of:

reducing the number of entries in the W matrix according to a predetermined threshold; and removing the corresponding rows in the V matrix.

23. The method of claim 18, further including prior to the performing a singular value decomposition step the steps of:

determining the rotation angles from the rotation data;

determining the translation data;

removing rotation data of the animated object from the vertices data matrix;

removing translation data of the animated object from the vertices data matrix;

forming a rotation-translation matrix, R, including the rotation angle and the translation data of the rotation data and translation data;

providing the rotation-translation matrix, R, from the source to the destination; and storing the rotation-translation matrix, R, at the source, wherein the step of reconstructing the vertices data matrix includes the step of multiplying the rotation-translation matrix, R, by the reconstructed vertices data matrix, $A_i$.

24. The method of claim 18 wherein the vertices data matrix, A, includes a plurality of column vectors, and wherein prior to the step of performing a SVD, calculating the mean, $M_0$, for each the matrix A, and removing the mean, $M_0$, from each entry in the matrix A, and wherein the step of reconstructing the vertices data matrix, A, further includes reconstructing the vertices data matrix as a function of the SVD coefficients, the SVD basis matrix, and the mean of each of the plurality of column vectors, $M_0$.

25. The method of claim 24, wherein the step of reconstructing the vertices data matrix includes the calculation $U* W* V^T + M_0$.

26. The method of claim 24, wherein the step of reconstructing the vertices data matrix is a function of the SVD coefficients, the SVD basis matrix, the mean of each of the plurality of column vectors, $M_0$, and the rotation-translation matrix R.

27. The method of claim 24, further including wherein the step of reconstructing the vertices data matrix includes the calculation $R \star (U* W* V^T + M_0)$.

28. The method of claim 18 wherein the step of providing the SVD basis matrix includes providing the SVD basis matrix on a computer readable medium.

29. The method of claim 23 wherein the step of providing matrix R, includes providing the matrix R on a computer readable medium.

30. A method for streaming, over a network connection between a source and a destination, an animated digital display including a plurality of digital image frames, the method comprising the steps of:

calculating a set of vertices for the object contained in each of the plurality of digital images using a mathematical model of the object;

combining the set of vertices for the object contained in each of the plurality of digital image frames into a vertices data matrix, A;

performing a singular value decomposition (SVD) on the vertices data matrix, wherein $A=U* W* V^T$;

determining the SVD basis matrix;

sending the SVD basis matrix from the source to the destination via the network connection;

determining a plurality of SVD coefficients;

storing the SVD basis matrix at the destination;

sending the plurality of SVD coefficients from the source to the destination via the network connection; and reconstructing the vertices data matrix as a function of the SVD coefficients and the SVD basis matrix.

31. A method for streaming, over a network connection between a source and a destination, an animated digital display including a plurality of digital image frames, the method comprising the steps of:

calculating a set of SVD coefficients for the object contained in each of the plurality of digital images using a mathematical model of the object;

determining the SVD basis matrix;

sending the SVD basis matrix from the source to the destination via the network connection;

determining a plurality of SVD coefficients;

storing the SVD basis matrix at the destination;

sending the plurality of SVD coefficients from the source to the destination via the network connection; and reconstructing the vertices data matrix as a function of the SVD coefficients and the SVD basis matrix.

32. A method for displaying an animated digital display on a display device including a plurality of digital image frames, each digital image frame containing an animated object having a plurality of vertices, each of the plurality of vertices having a corresponding spatial coordinate, the method comprising the steps of:

combining the set of vertices for the object contained in each of the plurality of digital image frames into a vertices data matrix, A;

performing a singular value decomposition (SVD) on the vertices data matrix, wherein $A=U \star W \star V^T$;

determining the SVD basis matrix;

providing the SVD basis matrix to the display device on a computer readable medium;

determining a plurality of SVD coefficients;

providing the plurality of SVD coefficients on a computer readable medium;

reconstructing the vertices data matrix, by the display device as a function of the provided SVD coefficients and the provided SVD basis matrix.

* * * * *

UNITED STATES PATENT AND TRADEMARK OFFICE
CERTIFICATE OF CORRECTION

PATENT NO. : 6,486,881 B2
DATED : November 26, 2002
INVENTOR(S) : Peter J. Hunter et al.

It is certified that error appears in the above-identified patent and that said Letters Patent is hereby corrected as shown below:

Column 2,
Line 67, "a" should read -- $\alpha$ --;

Column 4,
Line 17, Eq. 7, " $A_i = U_i \bullet (\Sigma \bullet V) = \{u_{k1}\sigma_k v_{k1}, u_{k2}\sigma_k v_{ks},...u_{kn}\sigma_k v_{kn}\}$ "
should read -- $A'_i = U'_i \bullet (\Sigma \bullet V) = \{u_{k1}\sigma_k v_{k1}, u_{k2}\sigma_k v_{ks},...u_{kn}\sigma_k v_{kn}\}$ --;

Line 19, "a" should read -- $\sigma$ --;
Line 20, "$v_1$ to $v_i$" shold read -- $v_1$ to $v_1$ --;

Line 33, Eq. 8, " $A_i = U_i * W * V^T$ " should read -- $A'_i = U'_i * W * V^T$ --;

Line 35, "A is" should read -- A'$_i$ is is --;

Column 8
Line 11, "R*(U*W★V$^T$+M$_0$)." should read --R*(U*W*V$^T$+M$_0$).--;

Column 11,
Line 34, "R★(U*W*V$^T$+M$_0$)." should read --R*(U*W*V$^T$+M$_0$).--; and Column 12,
Line 41, "A=U★W★V$^T$;" should read --A=U*W*V$^T$;--.

Signed and Sealed this

Thirtieth Day of September, 2003

JAMES E. ROGAN
*Director of the United States Patent and Trademark Office*